United States Patent
Kong et al.

(10) Patent No.: US 11,822,024 B2
(45) Date of Patent: Nov. 21, 2023

(54) PIXEL SENSING CIRCUIT, DRIVING METHOD THEREOF, DETECTION PANEL, AND ELECTRONIC DEVICE

(71) Applicants: Beijing BOE Sensor Technology Co., Ltd., Beijing (CN); BOE Technology Group Co., Ltd., Beijing (CN)

(72) Inventors: Dexi Kong, Beijing (CN); Cheng Li, Beijing (CN); Kunjing Chung, Beijing (CN); Lin Zhou, Beijing (CN); Jingjie Su, Beijing (CN); Jie Zhang, Beijing (CN); Tiansheng Li, Beijing (CN); Ziran Liu, Beijing (CN); Jin Cheng, Beijing (CN)

(73) Assignees: Beijing BOE Sensor Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 198 days.

(21) Appl. No.: 17/462,029

(22) Filed: Aug. 31, 2021

(65) Prior Publication Data
US 2022/0214463 A1 Jul. 7, 2022

(30) Foreign Application Priority Data
Jan. 6, 2021 (CN) .......................... 202110010728.2

(51) Int. Cl.
*G01T 1/175* (2006.01)
*H04N 5/32* (2023.01)
*G01T 1/20* (2006.01)

(52) U.S. Cl.
CPC .......... *G01T 1/175* (2013.01); *G01T 1/20184* (2020.05); *H04N 5/32* (2013.01)

(58) Field of Classification Search
CPC ....... G01T 1/175; G01T 1/20184; H04N 5/32; H04N 25/74; H04N 25/76; H04N 25/766; G01N 23/04
See application file for complete search history.

(56) References Cited

U.S. PATENT DOCUMENTS

| | | | |
|---|---|---|---|
| 10,250,832 B1 * | 4/2019 | Xu | H04N 25/778 |
| 2016/0373673 A1 * | 12/2016 | Okura | H04N 25/627 |
| 2017/0302870 A1 * | 10/2017 | Ikuma | H04N 25/709 |

* cited by examiner

*Primary Examiner* — Michael E Teitelbaum
(74) *Attorney, Agent, or Firm* — Ling Wu; Stephen Yang; Ling and Yang Intellectual Property (57) ABSTRACT

Provided is a pixel sensing circuit, including a signal generation sub-circuit, a reset sub-circuit, an amplification sub-circuit, and a read sub-circuit. The reset sub-circuit is configured to provide a signal of a first power supply line to a first node under control of a reset signal line. The signal generation sub-circuit is configured to detect a light signal and convert the detected light signal into an electrical signal. The amplification sub-circuit is configured to provide an amplified electrical signal to a second node according to a signal provided by a second power supply line and under control of the first node. The read sub-circuit is configured to output the amplified electrical signal to a signal read line under control of a scan signal line.

14 Claims, 10 Drawing Sheets

PIXEL SENSING CIRCUIT, DRIVING METHOD THEREOF, DETECTION PANEL, AND ELECTRONIC DEVICE

CROSS-REFERENCE TO RELATED APPLICATION

The present application claims the priority to Chinese Patent Application No. 202110010728.2 filed to the CNIPA on Jan. 6, 2021, the content of which is incorporated herein by reference.

TECHNICAL FIELD

Embodiments of the present disclosure relate to, but are not limited to, the field of detection technologies, in particular to a pixel sensing circuit and a driving method thereof, a detection panel, and an electronic device.

BACKGROUND

An X-Ray imaging technology is widely used in fields of industrial nondestructive testing, container scanning, circuit board inspection, medical treatment, security, industry, etc., and has broad application prospects. A traditional X-Ray imaging technology belongs to analog signal imaging, with low resolution and poor image quality. In an X-Ray Digital Radiography (DR) that appeared in the late 1990s, an X-Ray image is directly converted into a digital image by using an X-Ray Flat Panel Detector. Since the converted digital image is clear, has high resolution, and is easy to save and transmit, the DR has become a hot spot of current research. According to different structures, X-Ray Flat Panel Detectors are divided into Direct DR and Indirect DR. Among them, due to technologies of Indirect DR X-Ray Flat Panel Detectors are relatively mature, advantages of relatively low cost, high Detective Quantum Efficiency (DQE), and good reliability have been widely developed and applied.

SUMMARY

The following is a summary of subject matter described in detail in the present disclosure. This summary is not intended to limit the scope of protection of claims.

Embodiments of the present disclosure provide a pixel sensing circuit, a driving method thereof, a detection panel, and an electronic device.

On one hand, an embodiment of the present disclosure provides a pixel sensing circuit, which includes a signal generation sub-circuit, a reset sub-circuit, an amplification sub-circuit, and a read sub-circuit. The reset sub-circuit is connected to a reset signal line, a first power supply line, and a first node, and is configured to provide a signal of the first power supply line to the first node under control of the reset signal line; the signal generation sub-circuit is connected to a bias signal line and the first node, and is configured to detect a light signal and convert the detected light signal into an electrical signal; the amplification sub-circuit is connected to a second power supply line, the first node, and a second node, and is configured to provide an amplified electrical signal to the second node according to a signal provided by the second power supply line and under control of the first node; and the read sub-circuit is connected to a scan signal line, the second node, and a signal read line, and is configured to output the amplified electrical signal to the signal read line under control of the scan signal line.

In some exemplary embodiments, a valid level signal provided by the first power supply line and a valid level signal provided by the second power supply line have a same polarity but have different durations.

In some exemplary embodiments, a voltage value of the valid level signal provided by the second power supply line is greater than or equal to a voltage value of the valid level signal provided by the first power supply line.

In some exemplary embodiments, the scan signal line and the second power supply line provide a same pulse signal timing sequence.

In some exemplary embodiments, start time of a valid level signal provided by the second power supply line is earlier than start time of a valid level signal provided by the scan signal line, and end time of the valid level signal provided by the second power supply line is not earlier than end time of the valid level signal of the scan signal line.

In some exemplary implementation, wherein the reset sub-circuit includes a reset transistor; a control electrode of the reset transistor is connected to the reset signal line, a first electrode of the reset transistor is connected to the first power supply line, and a second electrode of the reset transistor is connected to the first node. The signal generation sub-circuit at least includes a photoelectric converter; wherein a first electrode of the photoelectric converter is connected to the first node and a second electrode of the photoelectric converter is connected to the bias signal line. The amplification sub-circuit includes an amplification transistor, a control electrode of the amplification transistor is connected to the first node, a first electrode of the amplification transistor is connected to the second power supply line, and a second electrode of the amplification transistor is connected to the second node. The read sub-circuit includes a read transistor, wherein a control electrode of the read transistor is connected to a scan signal line, a first electrode of the read transistor is connected to the second node, and a second electrode of the read transistor is connected to the signal read line.

In some exemplary embodiments, the signal generation sub-circuit further includes a storage capacitor, wherein a first electrode of the storage capacitor is connected to the first node, and a second electrode of the storage capacitor is connected to the bias signal line.

On another hand, an embodiment of the present disclosure provides a driving method of a pixel sensing circuit, which is applied to any of the above pixel sensing circuits, and the driving method includes: providing, by a reset sub-circuit, a signal of a first power supply line to a first node under control of a reset signal line; detecting, by a signal generation sub-circuit, a light signal and converting, by the signal generation sub-circuit, the detected light signal into an electrical signal; providing, by an amplification sub-circuit, an amplified electrical signal to a second node according to a signal provided by a second power supply line and under control of the electrical signal generated by the signal generation sub-circuit; and outputting, by a read sub-circuit, the amplified electrical signal to a signal read line under control of a scan signal line.

On another hand, an embodiment of the present disclosure provides a detection panel including: a detection region and a peripheral region located at a periphery of the detection region; the detection region includes a plurality of any of the foregoing pixel sensing circuits disposed on a base substrate; the peripheral region is at least provided with a power driver, and the power driver is configured to be connected to a pixel sensing circuit through a second power supply line.

In some exemplary implementations, the power driver includes at least one of the following: a gate driver on array (GOA) circuit disposed on the base substrate, a chip on glass (COG) disposed on the base substrate, and a wire on array (WOA) disposed on the base substrate.

In some exemplary embodiments, the peripheral region is provided with at least one Y-PCB, and the power driver is provided on the Y-PCB.

In some exemplary embodiments, the peripheral region is further provided with a gate driver configured to be connected to the pixel sensing circuit through a reset signal line and a scan signal line. And the power driver and the gate driver are respectively disposed on different Y-PCBs; or, the power driver and the gate driver are disposed on a same Y-PCB.

In some exemplary implementations, the peripheral region is further provided with an X-PCB, and the power driver is disposed on the X-PCB.

On another hand, an embodiment of the present disclosure provides an electronic device including any of the detection panels described above.

After reading and understanding drawings and detailed description, other aspects may be understood.

BRIEF DESCRIPTION OF DRAWINGS

Accompanying drawings are used to provide an understanding of technical solutions of the present disclosure and form a part of the specification. Together with the embodiments of the present disclosure, they are used to explain the technical solutions of the present disclosure but do not constitute a limitation on the technical solutions of the present disclosure. Shapes and sizes of one or more components in the accompanying drawings do not reflect real scales, and are only for a purpose of schematically illustrating contents of the present disclosure.

DETAILED DESCRIPTION

The embodiments of the present disclosure are described below with reference to the accompanying drawings. The embodiments may be implemented in a plurality of different forms. Those of ordinary skills in the art may readily understand a fact that implementations and contents may be transformed into one or more of forms without departing from the spirit and scope of the present disclosure. Therefore, the present disclosure should not be interpreted as being limited to contents recited in the following embodiments. The embodiments in the present disclosure and features in the embodiments may be randomly combined with each other if there is no conflict.

In the drawings, a size of one or more constituent elements, or a thickness or a region of a layer, is sometimes exaggerated for clarity. Therefore, an implementation of the present disclosure is not necessarily limited to the size shown, and a shape and a size of each component in the drawings do not reflect true proportions. In addition, the drawings schematically illustrate ideal examples, and any embodiment of the present disclosure is not limited to shapes, numerical values or the like illustrated in the drawings.

The "first", "second", "third" and other ordinal numbers in the present disclosure are used to avoid confusion of constituent elements, not to provide any quantitative limitation. In the present disclosure, "plurality" means a quantity of two or more.

In the present disclosure, for the sake of convenience, wordings such as "central", "upper", "lower", "front", "rear", "vertical", "horizontal", "top", "bottom", "inner", "outer" and the others describing orientations or positional relations are used to depict positional relations of constituent elements with reference to the drawings, which are only convenient for describing the specification and simplifying description, rather than for indicating or implying that the apparatus or element referred to must have a specific orientation, or must be constructed and operated in a particular orientation, and therefore, those wordings may not be construed as limitations on the present disclosure. The positional relations of the constituent elements may be appropriately changed according to a direction in which constituent elements are described. Therefore, the wordings described herein are not restrictive, and may be appropriately replaced according to a situation.

In the present disclosure, the terms "installed", "connected", and "coupled" shall be understood in their broadest sense unless otherwise explicitly specified and defined. For example, a connection may be a fixed connection, or a detachable connection, or an integrated connection, may be a mechanical connection or an electrical connection, or may be a direct connection, or an indirect connection through a middleware, or internal communication between two elements. Those of ordinary skills in the art may understand meanings of the above terms in the present disclosure according to a situation. An "electrical connection" includes a case where constituent elements are connected via an element having a certain electrical function. As long as electrical signals between the connected constituent elements may be sent and received through the "element having a certain electrical action", there is no special limitation to the "element having a certain electrical action". Examples of the "element having a certain electrical action" not only include electrodes and wirings, but also include switch elements such as transistors, resistors, inductors, capacitors, and other elements with one or more functions.

In the present disclosure, a transistor refers to an element including at least three terminals, namely, a gate electrode, a drain electrode, and a source electrode. The transistor has a channel region between the drain electrode (drain electrode terminal, drain region, or drain electrode) and the source electrode (source electrode terminal, source region, or source electrode), and a current may flow through the drain electrode, the channel region, and the source electrode. In the present disclosure, the channel region refers to a region through which the current mainly flows.

In the present disclosure, in order to distinguish two electrodes of the transistor except a gate, one of the electrodes is referred to as a first electrode and the other electrode is referred to as a second electrode. The first electrode may be a source or a drain, and the second electrode may be a drain or a source. In addition, the gate of the transistor is called a control electrode. In a case of using transistors with opposite polarities or in a case where a direction of a current in circuit operation changes, functions of the "source electrode" and the "drain electrode" may be interchanged sometimes. Therefore, in the present disclosure, "the source electrode" and "the drain electrode" are interchangeable.

In the present disclosure, a valid level signal includes a level signal that turns on a transistor. For example, a valid level signal for turning on a P-type transistor is a low-level signal, and a valid level signal for turning on an N-type transistor is a high-level signal.

Generally speaking, an imaging principle of a simple Indirect DR Flat Panel Detector (FPD) is as follows: an X-Ray irradiates an interior of a Flat Panel Detector, first passes through Scintillators, which absorb the X-Ray and convert it into visible light, and then visible light enters a detection panel. A pixel sensing circuit array on the detection panel converts the visible light generated by the scintillators into electrical signals, the electrical signals are amplified, and analog signals are converted into digital signals through an analog-to-digital converter to obtain a display image.

Embodiments of the present disclosure provide a pixel sensing circuit, a driving method thereof, a detection panel, and an electronic device, which may reduce shot noises of the pixel sensing circuit, improve a signal-to-noise ratio, and improve image quality of a detection panel.

Figure 1:
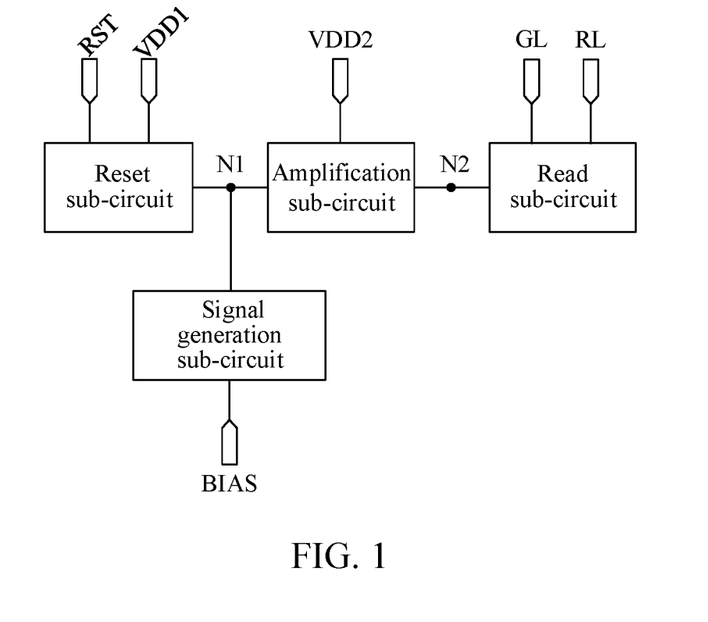
FIG. 1 is a schematic diagram of a pixel sensing circuit according to at least one embodiment of the present disclosure.

FIG. 1 is a schematic diagram of a pixel sensing circuit according to at least one embodiment of the present disclosure. As shown in FIG. 1, the pixel sensing circuit of this exemplary embodiment includes: a signal generation sub-circuit, a reset sub-circuit, an amplification sub-circuit, and a read sub-circuit. The reset sub-circuit is connected to a reset signal line RST, a first power supply line VDD1, and a first node N1, and the reset sub-circuit is configured to provide a signal of the first power supply line VDD1 to the first node N1 under control of the reset signal line RST. And the signal generation sub-circuit is connected to a bias signal line BIAS and the first node N1, and the signal generation sub-circuit is configured to detect a light signal and convert the detected light signal into an electrical signal. The amplification sub-circuit is connected to a second power supply line VDD2, the first node N1, and a second node N2, and the amplification sub-circuit is configured to provide an amplified electrical signal to the second node N2 according to a signal provided by the second power supply line VDD2 and under control of the first node N1. The read sub-circuit is connected to a scan signal line GL, the second node N2, and a signal read line RL, and the read sub-circuit is configured to output the amplified electrical signal to the signal read line RL under control of the scan signal line GL.

According to the pixel sensing circuit provided by this exemplary embodiment, the reset sub-circuit and the amplification sub-circuit are connected to different power supply lines separately, so that different power signals are provided to the reset sub-circuit and the amplification sub-circuit, thereby reducing shot noises of the pixel sensing circuit and improving a signal-to-noise ratio.

In some exemplary embodiments, a valid level signal provided by the first power supply line and a valid level signal provided by the second power supply line have a same polarity but have different durations. For example, valid level signals provided by the first power supply line and the second power supply line are both high-level signals, and the first power supply line may continuously provide high-level signals while the second power supply line periodically provides high-level signals, that is, the second power supply line provides pulse signals with high-level valid voltages. However, this embodiment is not limited thereto. In this exemplary embodiment, by providing different power signals to the reset sub-circuit and the amplification sub-circuit, shot noises of the pixel sensing circuit may be reduced and a signal-to-noise ratio may be improved.

In some exemplary embodiments, a voltage value of the valid level signal provided by the second power supply line is greater than or equal to a voltage value of the valid level signal provided by the first power supply line. However, this embodiment is not limited thereto. In this exemplary embodiment, by increasing the voltage value of the valid level signal of the second power supply line, amplification gains of the amplification sub-circuit may be enhanced, and a noise suppression effect on wiring and a readout processing circuit may be better, thereby improving a signal-to-noise ratio.

In some exemplary embodiments, the scan signal line and the second power supply line provide a same pulse signal timing sequence. In this exemplary embodiment, by setting a pulse signal timing sequence provided by the second power supply line to be the same as a pulse signal timing sequence provided by the scan signal line, it is possible to provide a valid level signal to the amplification sub-circuit through the second power supply line only when the read sub-circuit outputs an amplified electrical signal to the signal read line, thereby avoiding an occurrence of shot noises caused by continuously providing valid level signals to the amplification sub-circuit through the second power supply line, and improving a signal-to-noise ratio of a pixel sensing circuit.

In some exemplary embodiments, start time of a valid level signal provided by the second power supply line is earlier than start time of an valid level signal provided by the scan signal line, and end time of the valid level signal provided by the second power supply line is not earlier than end time of the valid level signal of the scan signal line. In this exemplary embodiment, by setting the start time of the valid level signal provided by the second power supply line to be earlier than the start time of the valid level signal provided by the scan signal line, a transient current caused by the same start time of the valid level signal provided by the second power supply line and the scan signal line is avoided, thereby further reducing noises and improving a signal-to-noise ratio.

Figure 2:
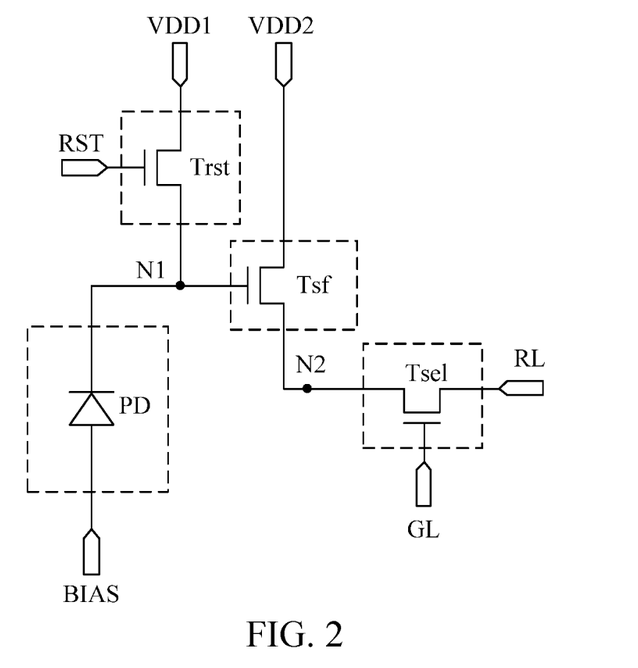
FIG. 2 is a schematic diagram of an equivalent circuit of a pixel sensing circuit according to at least one embodiment of the present disclosure.

FIG. 2 is a schematic diagram of an equivalent circuit of a pixel sensing circuit according to at least one embodiment of the present disclosure. As shown in FIG. 2, the pixel sensing circuit of this exemplary embodiment includes: a signal generation sub-circuit, a reset sub-circuit, an amplification sub-circuit, and a read sub-circuit. The signal generation sub-circuit includes a photoelectric converter PD. A first electrode of the photoelectric converter PD is connected to a first node N1, and a second electrode of the photoelectric converter PD is connected to a bias signal line BIAS. The reset sub-circuit includes a reset transistor Trst. A control electrode of the reset transistor TRST is connected to a reset signal line RST, a first electrode of the reset transistor Trst is connected to a first power supply line VDD1, and a second electrode of the reset transistor Trst is connected to the first node N1. The amplification sub-circuit includes an amplification transistor Tsf. A control electrode of the amplification transistor Tsf is connected to the first node N1, a first electrode of the amplification transistor Tsf is connected to a second power supply line VDD2, and a second electrode of the amplification transistor Tsf is connected to a second node N2. The read sub-circuit includes a read transistor Tsel. A control electrode of the read transistor Tsel is connected to a scan signal line GL, a first electrode of the read transistor Tsel is connected to a second node N2, and a second electrode of the read transistor Tsel is connected to a signal read line RL.

Figure 3:
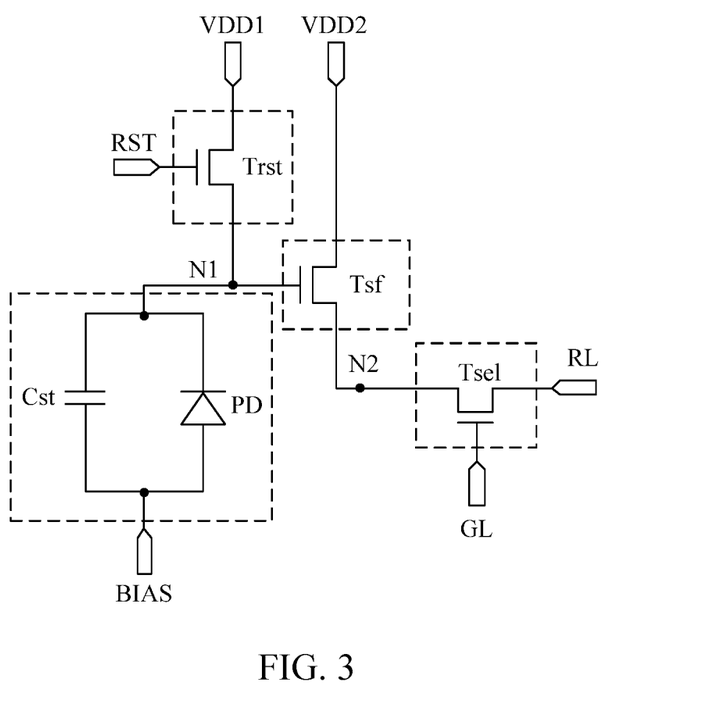
FIG. 3 is a schematic diagram of another equivalent circuit of a pixel sensing circuit according to at least one embodiment of the present disclosure.

FIG. 3 is a schematic diagram of another equivalent circuit of a pixel sensing circuit according to at least one embodiment of the present disclosure. As shown in FIG. 3, the pixel sensing circuit of this exemplary embodiment includes: a signal generation sub-circuit, a reset sub-circuit, an amplification sub-circuit, and a read sub-circuit. The signal generation sub-circuit includes: a storage capacitor Cst and a photoelectric converter PD. A first electrode of the storage capacitor Cst is connected to a first node N1, and a second electrode of the storage capacitor Cst is connected to a bias signal line BIAS. A first electrode of the photoelectric converter PD is connected to the first node N1, and a second electrode of the photoelectric converter PD is connected to the bias signal line BIAS. The reset sub-circuit includes a reset transistor Trst. A control electrode of the reset transistor TRST is connected to a reset signal line RST, a first electrode of the reset transistor Trst is connected to a first power supply line VDD1, and a second electrode of the reset transistor Trst is connected to the first node N1. The amplification sub-circuit includes an amplification transistor Tsf. A control electrode of the amplification transistor Tsf is connected to the first node N1, a first electrode of the amplification transistor Tsf is connected to a second power supply line VDD2, and a second electrode of the amplification transistor Tsf is connected to a second node N2. The read sub-circuit includes a read transistor Tsel. A control electrode of the read transistor Tsel is connected to a scan signal line GL, a first electrode of the read transistor Tsel is connected to the second node N2, and a second electrode of the read transistor Tsel is connected to a signal read line RL.

In some exemplary embodiments, the photoelectric converter may be a PIN junction photodiode. However, this embodiment is not limited thereto. In some examples, the photoelectric converter may adopt other devices, such as a Pinned Diode, for realizing photoelectric conversion.

In this exemplary embodiment, some exemplary structures of a reset sub-circuit, an amplification sub-circuit, a read sub-circuit, and a signal generation sub-circuit are shown in FIGS. 2 and 3. Those skilled in the art may easily understand that implementations of the reset sub-circuit, the amplification sub-circuit, the read sub-circuit, and the signal generation sub-circuit are not limited thereto as long as their respective functions can be realized.

Figure 4:
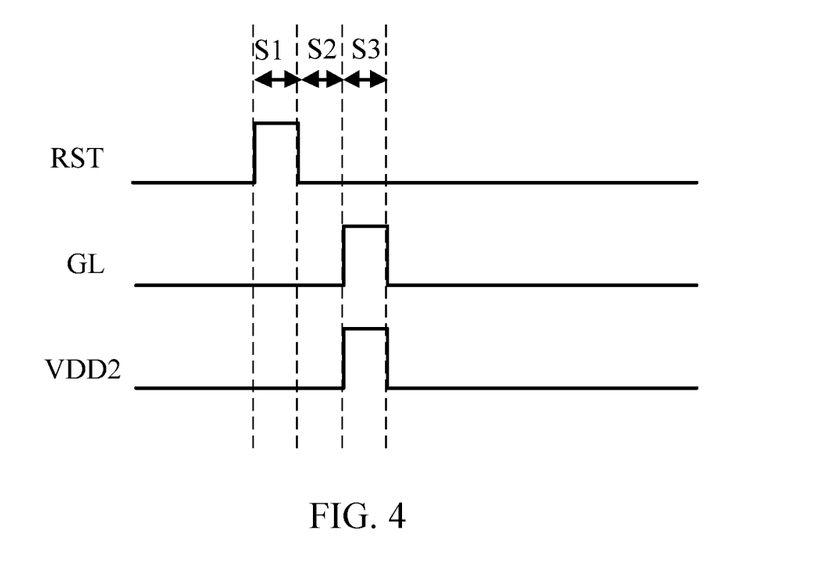
FIG. 4 is a schematic diagram of a working timing sequence of the pixel sensing circuit shown in FIG. 2 or FIG. 3.

Taking the reset transistor Trst, the amplification transistor Tsf, and the read transistor Tsel shown in FIG. 3 all being N-type transistors as an example, a technical solution of the embodiment of the present disclosure will be further explained through a working process of the pixel sensing circuit shown in FIG. 3. FIG. 4 is a schematic diagram of a working timing sequence of the pixel sensing circuit shown in FIG. 2 or FIG. 3. As shown in FIGS. 3 and 4, the pixel sensing circuit of this exemplary embodiment includes three transistor units (i.e., the reset transistor TRST, the amplification transistor Tsf, and the read transistor Tsel), one photodiode PD, one capacitor unit (i.e., a storage capacitor Cst), three input terminals (i.e., a reset signal line RST, a scan signal line GL, and a bias signal line BIAS), one output terminal (i.e., a signal read line RL), and two power supply terminals (i.e. a first power supply line VDD1 and a second power supply line VDD2). The first power supply line VDD1 continuously provides a high-level signal, and the second power supply line VDD2 periodically provides a high-level signal. Polarities of valid level signals provided by the first power supply line VDD1 and the second power supply line VDD2 may be set according to types of transistors and gate potentials of transistors, which is not limited hereto in the present embodiment.

The working process of the pixel sensing circuit of this exemplary embodiment includes following stages.

In a first stage S1, that is, a Reset stage, the reset signal line RST provides a high-level signal, the scan signal line GL provides a low-level signal, the reset transistor Trst is turned on to reset a level signal of the first node N1, and the read transistor Tsel is turned off. The photoelectric converter PD is in a no light state.

In a second stage S2, that is, an Integration stage, the reset signal line RST provides a low-level signal, the scan signal line GL provides a low-level signal, the reset transistor Trst is turned off, and the read transistor Tsel is turned off. In response to a received light signal, the photoelectric converter PD generates an electrical signal to change the level signal of the first node N1.

In a third stage S3, that is, a Readout stage, the reset signal line RST provides a low-level signal, the scan signal line GL provides a high-level signal, the reset transistor Trst is turned off, and the read transistor Tsel is turned on. Under control of the first node N1, the amplification transistor Tsf provides an amplified electrical signal to the second node N2 according to a signal provided by the second power supply line VDD2. The read transistor Tsel is turned on to provide an electrical signal amplified by the amplification transistor Tsf to the signal read line RL.

In this exemplary embodiment, in different stages, the first power supply line VDD1 continuously provides high-level signals, while the second power supply line VDD2 provides valid level signals only in the Readout stage (i.e., the third stage S3), thus avoiding a weak leakage current generated by the amplification transistor being read as shot noises in a non-readout stage, which may reduce noises and improve a signal-to-noise ratio.

Figure 5:
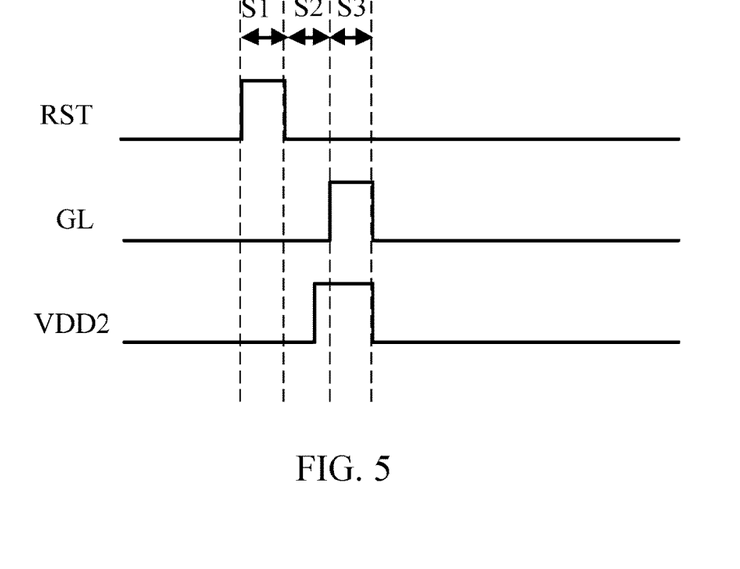
FIG. 5 is a schematic diagram of another working timing sequence of the pixel sensing circuit shown in FIG. 2 or FIG. 3.

FIG. 5 is a schematic diagram of another working timing sequence of the pixel sensing circuit shown in FIG. 2 or FIG. 3. As shown in FIG. 5, in this exemplary embodiment, start time of a valid level signal provided by the second power supply line VDD2 is earlier than start time of a valid level signal provided by the scan signal line GL, and end time of a valid level signal provided by the second power supply line VDD2 is the same as end time of a valid level signal provided by the scan signal line GL. However, this embodiment is not limited thereto. For example, the end time of the valid level signal provided the second power supply line may be later than the end time of the valid level signal provided by the scan signal line.

Compared with the diagram of working timing sequence shown in FIG. 4, in this exemplary embodiment, the start time of the valid level signal of the second power supply line is advanced, which may prevent the valid level signal of the second power supply line and the valid level signal of the scan signal line from being turned on at the same time to generate a transient current, further reduce noises, and thereby improve a signal-to-noise ratio.

For remaining working stages of the exemplary embodiment, reference may be made to the description of the embodiment shown in FIG. 4, so details will not be repeated here.

At least one embodiment of the present disclosure further provides a driving method of a pixel sensing circuit, the driving method is applied to any of the above pixel sensing circuits, and the driving method includes: a reset sub-circuit provides a signal of a first power supply line to a first node under control of a reset signal line; a signal generation sub-circuit detects a light signal and converts the detected light signal into an electrical signal; under control of the electrical signal generated by the signal generation sub-circuit, an amplification sub-circuit provides an amplified electrical signal to a second node according to a signal provided by a second power supply line; and a read sub-circuit outputs the amplified electrical signal to a signal read line under control of a scan signal line.

For the description of the driving method of this embodiment, reference may be made to the description of the foregoing embodiments, so details will not be repeated here.

At least one embodiment of the present disclosure further provides a detection panel, which includes a detection region and a peripheral region located at a periphery of the detection region. The detection region includes a plurality of pixel sensing circuits disposed on a base substrate. The peripheral region is at least provided with a power driver, and the power driver is configured to be connected to a pixel sensing circuit through a second power supply line. For the description of the pixel sensing circuits, reference may be made to the description of the foregoing embodiments, so details will not be repeated here.

In some exemplary embodiments, the peripheral region is further provided with a controller, a gate driver, and a data processor. The gate driver is configured to provide a reset signal to the pixel sensing circuit through a reset signal line and to provide a scan signal to the pixel sensing circuit through a scan signal line. The data processor is configured to read a signal from the pixel sensing circuit through a signal read line. The controller may provide drive signals to the data processor and the gate driver. Actions of the gate driver and the data processor may be controlled by the controller, and the controller may provide a drive signal to the data processor so that the data processor processes an electrical signal read from a pixel sensing circuit of a designated row. The gate driver may select a pixel sensing circuit of a designated row to output an electrical signal under control of the controller.

The detection panel according to the present embodiment will be illustrated by a plurality of examples below. The pixel sensing circuit in the following examples is as described in the foregoing embodiments, so details will not be repeated here.

Figure 6:
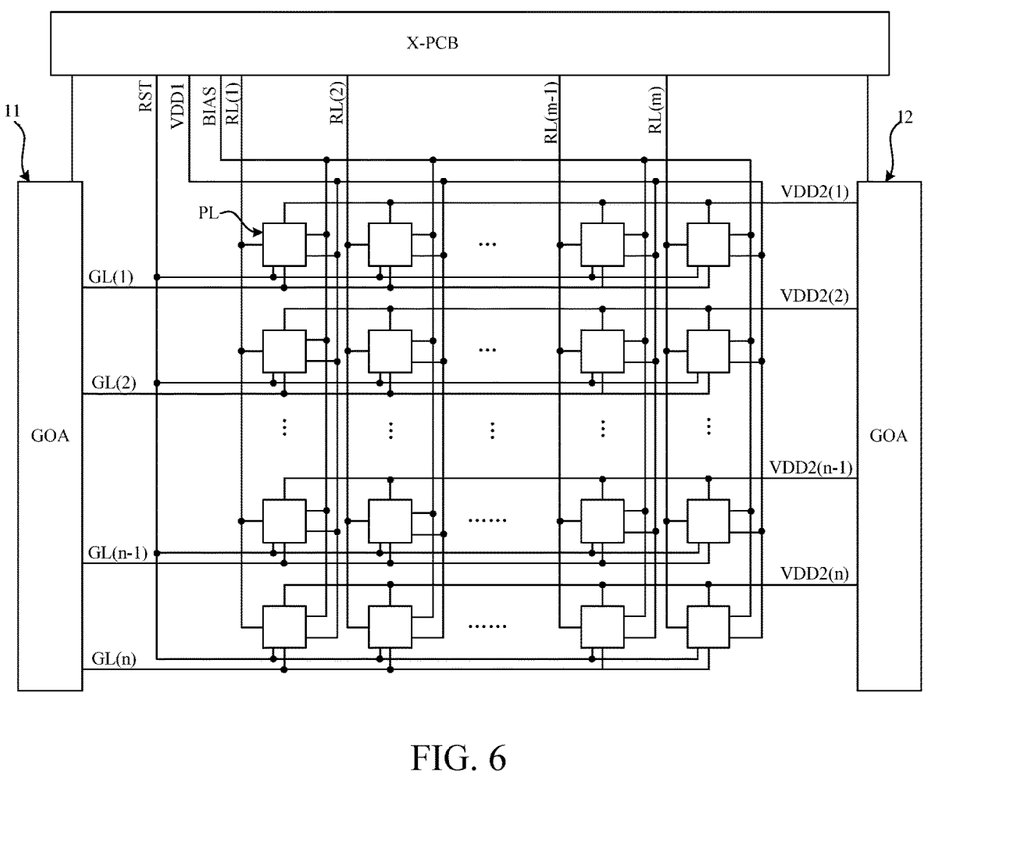
FIG. 6 is a schematic diagram of a detection panel according to at least one embodiment of the present disclosure.

FIG. 6 is a schematic diagram of a detection panel according to at least one embodiment of the present disclosure. As shown in FIG. 6, the detection panel of this exemplary embodiment includes a detection region and a peripheral region located at a periphery of the detection region. The detection region is provided with a plurality of pixel sensing circuits PL disposed regularly. For example, the plurality of pixel sensing circuits PL may be disposed in an array. For example, the detection region is provided with n*m pixel sensing circuits, and n and m are positive integers.

In some exemplary embodiments, as shown in FIG. 6, the peripheral region is provided with at least a power driver, a gate driver, and a data processor. The data processor is disposed on an X-PCB on a side of a base substrate. The data processor may be connected to a pixel sensing circuit of the detection region through a signal read line to read a signal from the pixel sensing circuit. The gate driver may include a control circuit and a gate driver on Array (GOA) circuit 11 disposed on the base substrate. The control circuit may be disposed on the X-PCB and configured to provide a reset signal to the pixel sensing circuit of the detection region through a reset signal line RST. The X-PCB may be configured to provide an initial signal and a clock signal to the GOA circuit 11. In some examples, the GOA circuit 11 may include a plurality of cascaded first shift register units. An input terminal of a first shift register unit of a first level is connected to an initial signal line to receive an initial signal, and an output terminal of a first shift register unit of an n-th level is connected to an input terminal of a first shift register unit of an (n+1)-th level. The GOA circuit 11 may provide a scan signal to the pixel sensing circuit of the detection region through a scan signal line. For example, the output terminal of the first shift register unit of the n-th level of the GOA circuit 11 provides a scan signal to a pixel sensing circuit of an n-th row through a scan signal line GL (n). In some examples, the power driver may include a GOA circuit 12 disposed on the base substrate. The X-PCB may be configured to provide an initial signal and a clock signal to the GOA circuit 12. In some examples, the GOA circuit 12 may include a plurality of cascaded second shift register units. An input terminal of a second shift register unit of a first level is connected to an initial signal line to receive an initial signal, and an output terminal of a second shift register unit of an n-th level is connected to an input terminal of a second shift register unit of an (n+1)-th level. The GOA circuit 12 may provide a power signal to the pixel sensing circuit of the detection region through a second power supply line. For example, the output terminal of the second shift register unit of the n-th level of the GOA circuit 12 provides a power signal to a pixel sensing circuit of an n-th row through a second power supply line VDD2 (n). However, this embodiment is not limited thereto.

Figure 7:
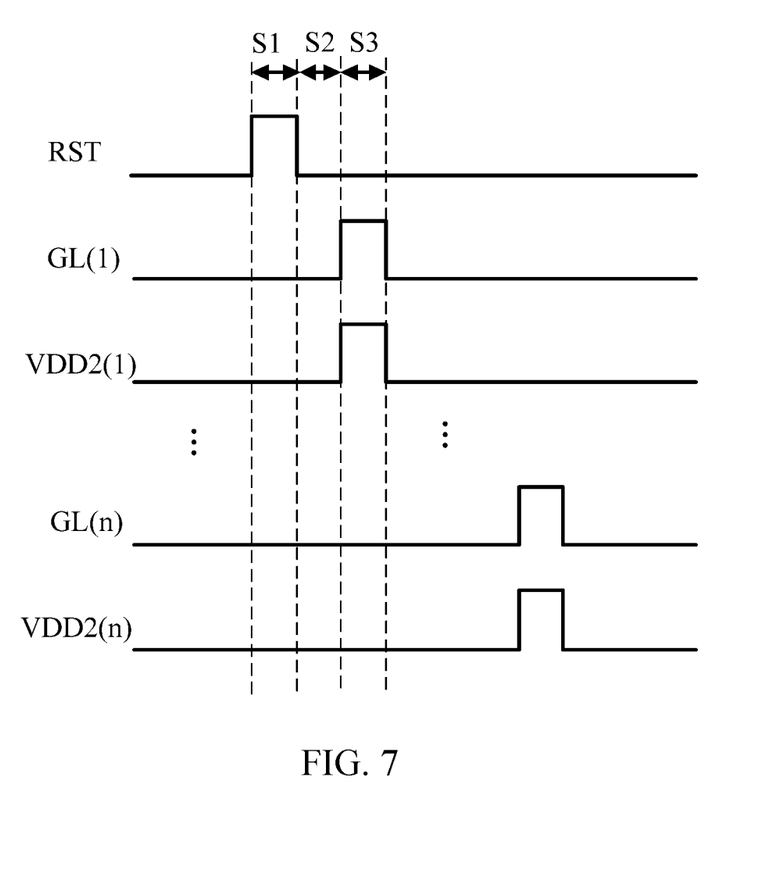
FIG. 7 is a schematic diagram of a working timing sequence of a detection panel according to at least one embodiment of the present disclosure.

In some exemplary embodiments, the GOA circuit 12 of the power driver and the GOA circuit 11 of the gate driver may be the same, so that a second power signal generated by the power driver and a scan signal generated by the gate driver have a same pulse signal timing sequence. A working timing sequence of the detection panel of this exemplary embodiment may be as shown in FIG. 7. As shown in FIG. 7, in a first stage S1, that is, a Reset stage, reset transistors of all pixel sensing circuits of the detection region are synchronously turned on and the signal generation sub-circuit is initialized. In a second stage S2, that is, an Integration stage, reset transistors and read transistors of all pixel sensing circuits of the detection region are all turned off. In a third stage S3, that is, a Readout stage, the readout transistors of the pixel sensing circuits are turned on line by line, so that signals are read out line by line. A second power supply line and a scan signal line connected to a pixel sensing circuit of a current readout row provide valid level signals, while second power supply lines and scan signal lines connected to pixel sensing circuits of other unread rows do not provide valid level signals. By turning off valid level signals of second power supply lines of unread rows when reading signals line by line, leakage currents of the unread rows may be reduced, thus reducing shot noises generated during signal reading and improving a signal-to-noise ratio.

Figure 8:
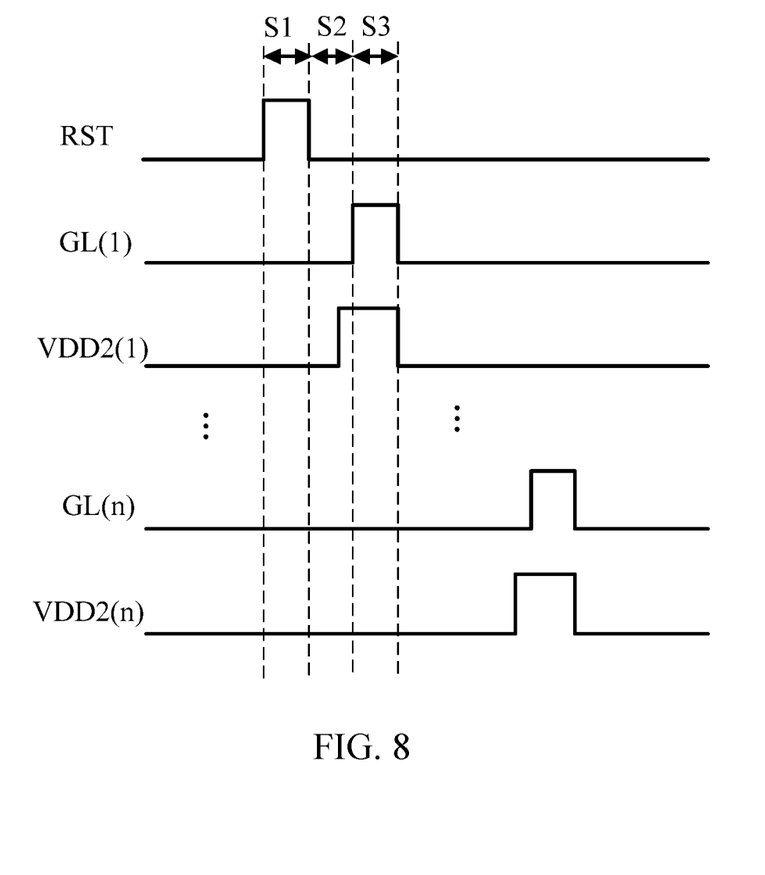
FIG. 8 is a schematic diagram of another working timing sequence of a detection panel according to at least one embodiment of the present disclosure.

In some exemplary embodiments, pulse signal timing sequences generated by the GOA circuit 12 of the power driver and the GOA circuit 11 of the gate driver may be different. A working timing sequence of the detection panel of this exemplary embodiment may be as shown in FIG. 8. Start time of a valid level signal provided by the GOA circuit 12 through a second power supply line is earlier than start time of a valid level signal provided by the GOA circuit 11 through a scan signal line, and end time of the valid level signal provided by the GOA circuit 12 through the second power supply line is the same as end time of the valid level signal provided by the GOA circuit 11 through the scan signal line. In this exemplary embodiment, by advancing the start time of the valid level signal of the second power supply line, transient currents may be avoided, thereby further reducing noises and improving a signal-to-noise ratio.

In some exemplary embodiments, as shown in FIG. 6, the GOA circuit 12 of the power driver and the GOA circuit 11 of the gate driver are disposed on opposite sides, such as left and right sides, of the detection region of the base substrate. The X-PCB is located on a side of the base substrate, such as an upper side or a lower side. However, this embodiment is not limited thereto.

The power driver of this exemplary embodiment is integrated on the base substrate by a GOA mode, which may reduce uses of external circuits of the detection panel, reduce costs, save an occupied area of the external circuits, effectively reduce a frame region, and improve an integration level of the detection panel.

Figure 9:
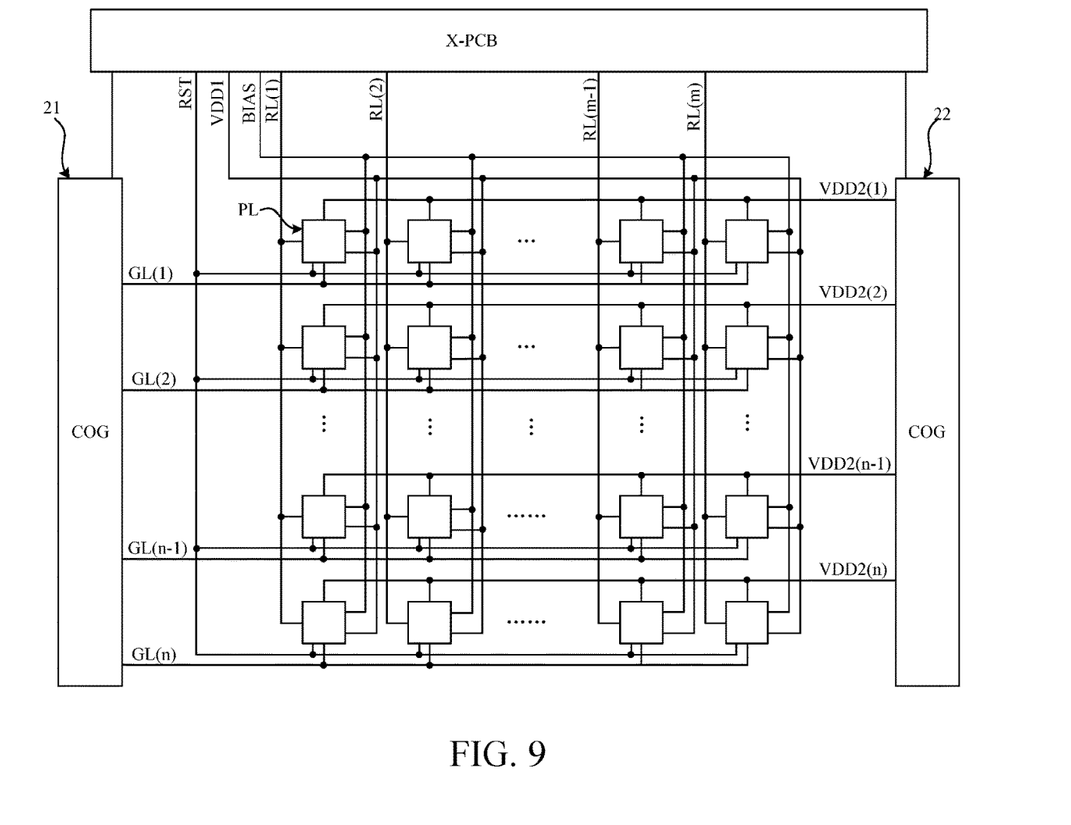
FIG. 9 is another schematic diagram of a detection panel according to at least one embodiment of the present disclosure.

FIG. 9 is another schematic diagram of a detection panel according to at least one embodiment of the present disclosure. As shown in FIG. 9, the detection panel of this exemplary embodiment includes a detection region and a peripheral region located at a periphery of the detection region. The peripheral region is at least provided with a power driver, a gate driver, and a data processor. The data processor may be disposed on an X-PCB on a side of a base substrate. The gate driver may include a Chip on Glass (COG) 21 disposed on the base substrate. The power driver may include a COG 22 disposed on the base substrate. The X-PCB may provide control signals to the COG 21 and the COG 22. However, this embodiment is not limited thereto.

For remaining structures and working processes of the exemplary embodiment, reference may be made to the description of the embodiment shown in FIG. 6, and thus, details will not be repeated here.

The power driver of this exemplary embodiment is integrated on the base substrate in a COG mode, which may decrease uses of external circuits of the detection panel, reduce costs, reduce a volume of the detection panel, facilitate a miniaturized design, and thus may further reduce noises and improve a signal-to-noise ratio.

Figure 10:
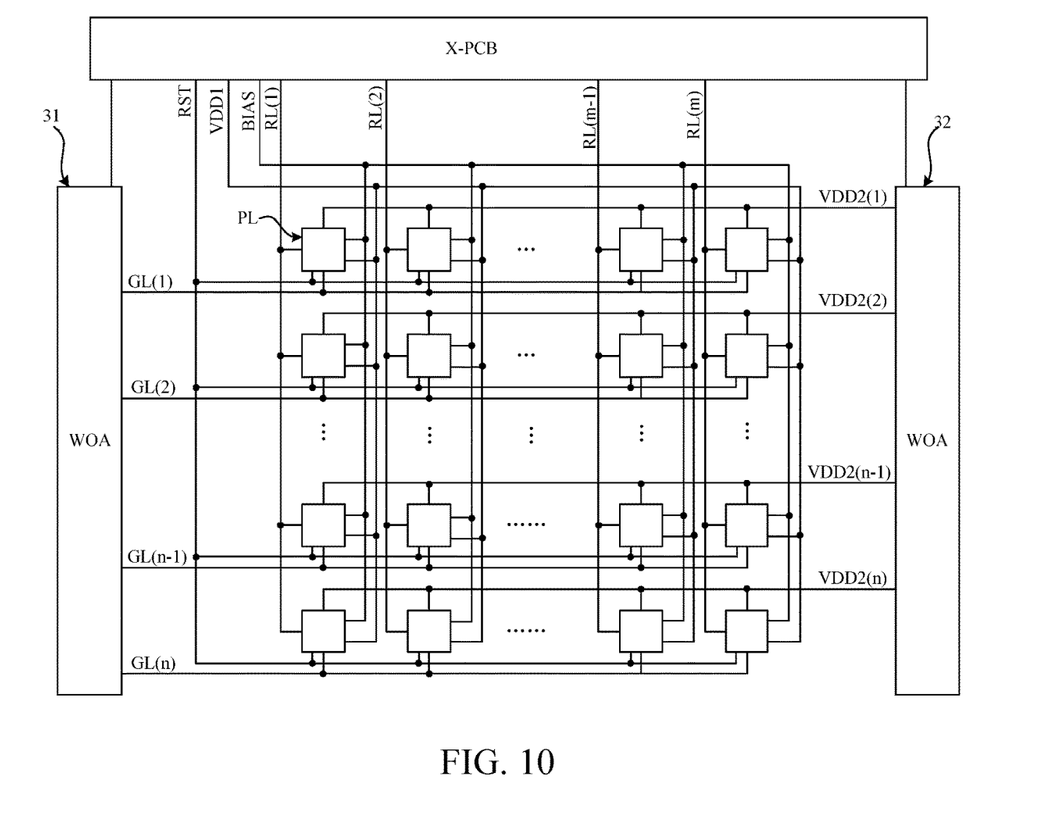
FIG. 10 is another schematic diagram of a detection panel according to at least one embodiment of the present disclosure.

FIG. 10 is another schematic diagram of a detection panel according to at least one embodiment of the present disclosure. As shown in FIG. 10, the detection panel of this exemplary embodiment includes a detection region and a peripheral region located at a periphery of the detection region. The peripheral region is at least provided with a power driver, a gate driver, and a data processor. The data processor may be disposed on an X-PCB on a side of a base substrate. The gate driver may include a control circuit disposed on the X-PCB, a Wire on Array (WOA) 31 disposed on the base substrate, and a gate drive circuit disposed outside the base substrate. The gate drive circuit is connected to a pixel sensing circuit through the WOA 31, and is configured to provide a scan signal to the pixel sensing circuit of the detection region through a scan signal line GL. The control circuit may be disposed on the X-PCB and configured to provide a reset signal to the pixel sensing circuit through a reset signal line RST. The power driver may include a power drive circuit and a WOA 32 disposed on the base substrate. The power drive circuit may be connected to the pixel sensing circuit through the WOA 32, and is configured to provide a power signal to the pixel sensing circuit of the detection region through a second power supply line VDD2. The X-PCB may provide control signals to the gate drive circuit and the power drive circuit.

For remaining structures and working processes of the exemplary embodiment, reference may be made to the description of the embodiment shown in FIG. 6, and thus, details will not be repeated here.

Figure 11:
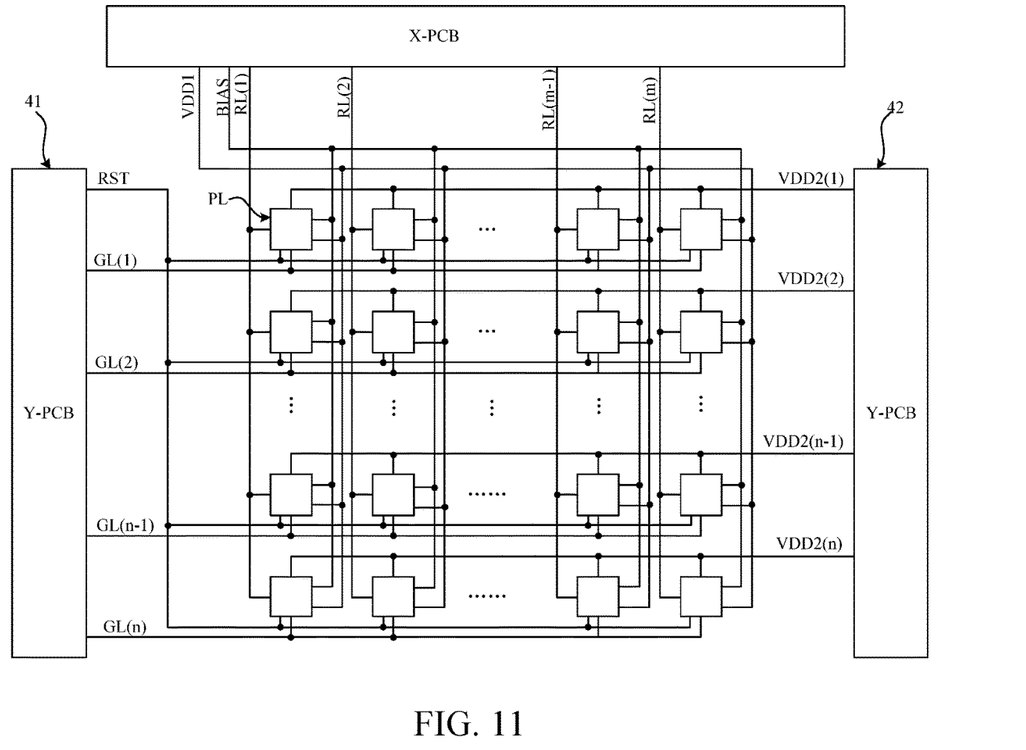
FIG. 11 is another schematic diagram of a detection panel according to at least one embodiment of the present disclosure.

FIG. 11 is another schematic diagram of a detection panel according to at least one embodiment of the present disclosure. As shown in FIG. 11, the detection panel of this exemplary embodiment includes a detection region and a peripheral region located at a periphery of the detection region. The peripheral region is at least provided with a power driver, a gate driver, and a data processor. The data processor may be disposed on an X-PCB on a side of a base substrate. The gate driver is disposed on a Y-PCB 41, and the power driver is disposed on a Y-PCB 42. The Y-PCB 41 and the Y-PCB 42 may be located on opposite sides of the base substrate, for example, left and right sides; the X-PCB is located on a side of the base substrate, for example, an upper side or a lower side. However, this embodiment is not limited thereto.

For remaining structures and working processes of the exemplary embodiment, reference may be made to the description of the embodiment shown in FIG. 6, and thus, details will not be repeated here.

Figure 12:
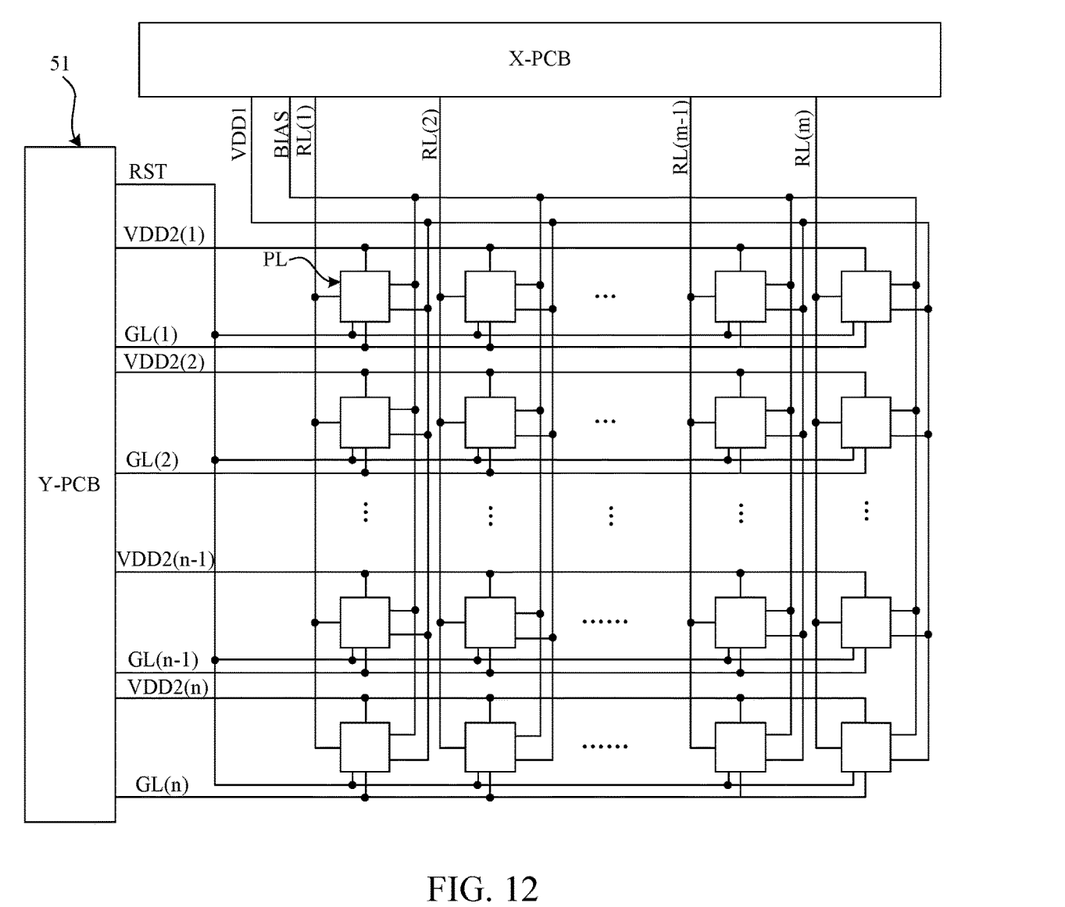
FIG. 12 is another schematic diagram of a detection panel according to at least one embodiment of the present disclosure.

FIG. 12 is another schematic diagram of a detection panel according to at least one embodiment of the present disclosure. As shown in FIG. 12, the detection panel of this exemplary embodiment includes a detection region and a peripheral region located at a periphery of the detection region. The peripheral region is at least provided with a power driver, a gate driver, and a data processor. The data processor may be disposed on an X-PCB on a side of a base substrate. The gate driver and the power driver are both disposed on a Y-PCB 51. In some examples, the gate driver and the power driver may be separately disposed at different positions of the Y-PCB 51; or, the gate driver and the power driver may be integrated on the Y-PCB 51. The Y-PCB 51 may be located on a side of the base substrate, for example, a left side or a right side; the X-PCB is located on a side of the base substrate, for example, an upper side or a lower side. However, this embodiment is not limited thereto.

For remaining structures and working processes of the exemplary embodiment, reference may be made to the description of the embodiment shown in FIG. 6, and thus, details will not be repeated here.

Figure 13:
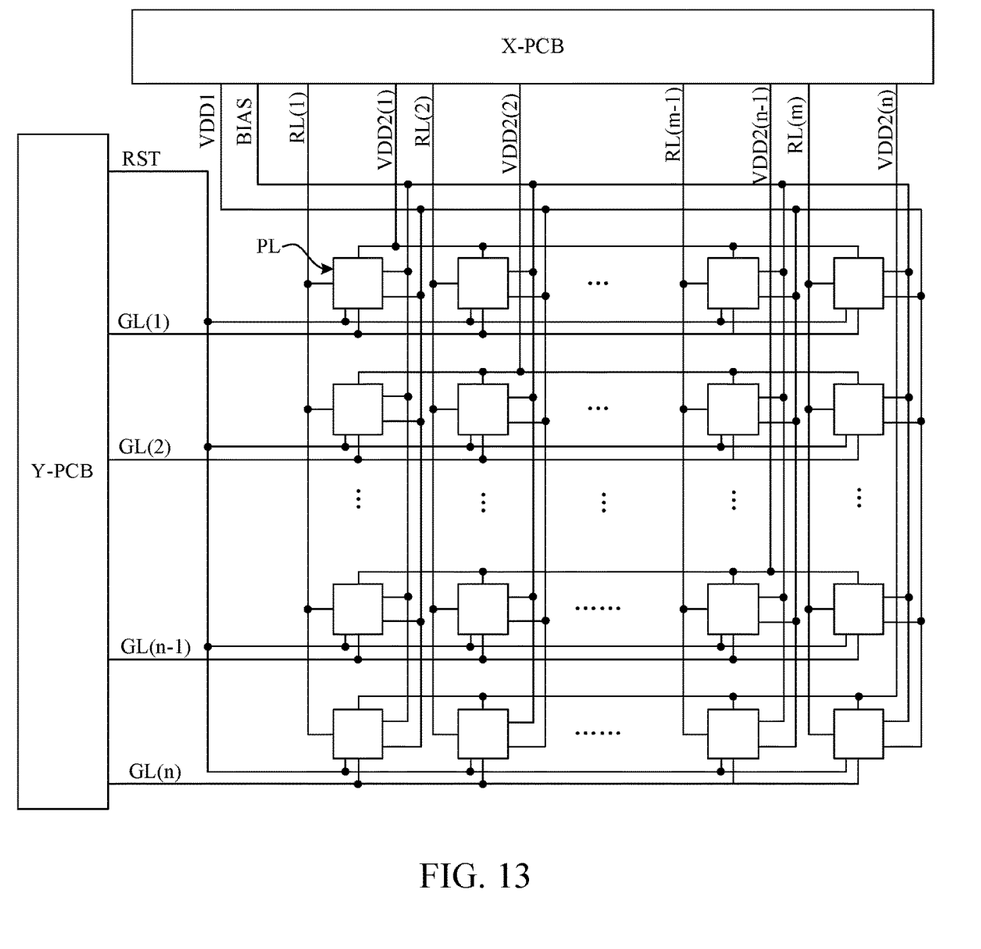
FIG. 13 is another schematic diagram of a detection panel according to at least one embodiment of the present disclosure.

FIG. 13 is another schematic diagram of a detection panel according to at least one embodiment of the present disclosure. As shown in FIG. 13, the detection panel of this exemplary embodiment includes a detection region and a peripheral region located at a periphery of the detection region. The peripheral region is at least provided with a power driver, a gate driver, and a data processor. The data processor and the power driver are disposed on an X-PCB on a side of a base substrate. The gate driver is disposed on a Y-PCB. The Y-PCB may be located on a side of the base substrate, for example, a left side or a right side; the X-PCB is located on a side of the base substrate, for example, an upper side or a lower side. However, this embodiment is not limited thereto.

For remaining structures and working processes of the exemplary embodiment, reference may be made to the description of the embodiment shown in FIG. 6, and thus, details will not be repeated here.

The foregoing structures provided by the embodiments of the present disclosure are only some exemplary structures. In some examples, the above structures may be combined in the same way. For example, the scan drive circuit may be disposed on the base substrate in a COG mode and the power drive circuit may be disposed on the base substrate in a GOA mode. However, this embodiment is not limited thereto.

According to the detection panel according to the embodiments, the valid level signal of the second power supply line and the valid level signal of the first power supply line of the pixel sensing circuit are controlled separately, and valid level signals of second power supply lines of unread rows are turned off when signals are read line by line, which may reduce leakage currents of the unread rows to reduce shot noises generated during signal reading, thereby reducing noises, improving a signal-to-noise ratio, and improving display image quality. Furthermore, by independently controlling the valid level signal of the second power supply line, the valid level signal of the second power supply line may be improved, thereby increasing amplification gains of amplification transistors, improving a signal-to-noise ratio and display image quality.

Figure 14:
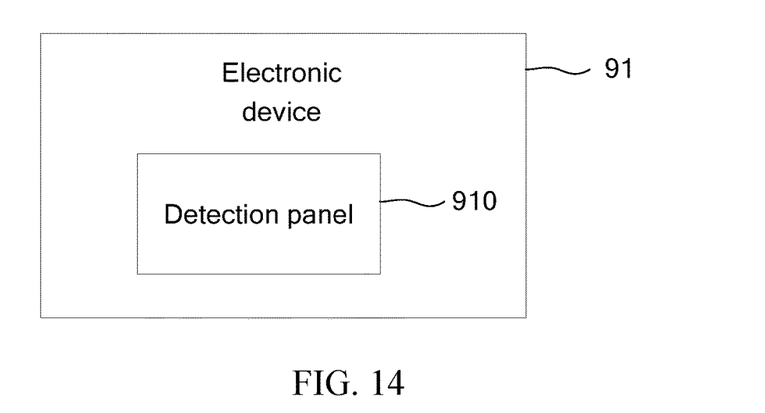
FIG. 14 is a schematic diagram of an electronic device according to at least one embodiment of the present disclosure.

FIG. 14 is a schematic diagram of an electronic device according to at least one embodiment of the present disclosure. As shown in FIG. 14, at least one embodiment of the present disclosure further provides an electronic device 91 including a detection panel 910. The detection panel 910 may be as described in the foregoing embodiments, which will not be repeated here. The electronic device 91 may be a Flat Panel Detector, a medical diagnostic device, an industrial detection device, a geological exploration device, etc. However, this embodiment is not limited thereto.

The drawings in the present disclosure only refer to the structures involved in the present disclosure, and common designs may be referred to for other structures. The embodiments of the present disclosure and features in the embodiments may be combined with each other to obtain a new embodiment if there is no conflict.

Those of ordinary skills in the art should understand that modifications or equivalent substitutions may be made to the technical solutions of the present disclosure without departing from the spirit and scope of the technical solutions of the present disclosure, all of which should be included within the scope of the claims of the present disclosure.

What is claimed is:

1. A pixel sensing circuit, comprising: a signal generation sub-circuit, a reset sub-circuit, an amplification sub-circuit, and a read sub-circuit; wherein
   the reset sub-circuit is connected to a reset signal line, a first power supply line, and a first node, and is configured to provide a signal of the first power supply line to the first node under control of the reset signal line;
   the signal generation sub-circuit is connected to a bias signal line and the first node, and is configured to detect a light signal and convert the detected light signal into an electrical signal;
   the amplification sub-circuit is connected to a second power supply line, the first node, and a second node, and is configured to provide an amplified electrical signal to the second node according to a signal provided by the second power supply line and under control of the first node; and
   the read sub-circuit is connected to a scan signal line, the second node, and a signal read line, and is configured to output the amplified electrical signal to the signal read line under control of the scan signal line;
   wherein a valid level signal provided by the first power supply line and a valid level signal provided by the second power supply line have a same polarity but have different durations; or the scan signal line and the second power supply line are configured to provide a same pulse signal timing sequence; or start time of a valid level signal provided by the second power supply line is earlier than start time of a valid level signal provided by the scan signal line, and end time of the valid level signal provided by the second power supply line is not earlier than end time of the valid level signal provided by the scan signal line.

2. The pixel sensing circuit of claim 1, wherein a voltage value of the valid level signal provided by the second power supply line is greater than or equal to a voltage value of the valid level signal provided by the first power supply line.

3. The pixel sensing circuit of claim 1, wherein the reset sub-circuit comprises a reset transistor; wherein a control electrode of the reset transistor is connected to the reset signal line, a first electrode of the reset transistor is connected to the first power supply line, and a second electrode of the reset transistor is connected to the first node;
   the signal generation sub-circuit at least comprises a photoelectric converter; wherein a first electrode of the photoelectric converter is connected to the first node, and a second electrode of the photoelectric converter is connected to the bias signal line;
   the amplification sub-circuit comprises an amplification transistor, wherein a control electrode of the amplification transistor is connected to the first node, a first electrode of the amplification transistor is connected to the second power supply line, and a second electrode of the amplification transistor is connected to the second node; and
   the read sub-circuit comprises a read transistor, wherein a control electrode of the read transistor is connected to the scan signal line, a first electrode of the read transistor is connected to the second node, and a second electrode of the read transistor is connected to the signal read line.

4. The pixel sensing circuit of claim 3, wherein the signal generation sub-circuit further comprises a storage capacitor, wherein a first electrode of the storage capacitor is connected to the first node, and a second electrode of the storage capacitor is connected to the bias signal line.

5. A driving method of a pixel sensing circuit, applied to the pixel sensing circuit of claim 1, the driving method comprising:
providing, by a reset sub-circuit, a signal of a first power supply line to a first node under control of a reset signal line;
detecting, by a signal generation sub-circuit, a light signal and converting, by the signal generation sub-circuit, the detected light signal into an electrical signal;
providing, by an amplification sub-circuit, an amplified electrical signal to a second node according to a signal provided by a second power supply line and under control of the electrical signal generated by the signal generation sub-circuit; and
outputting, by a read sub-circuit, the amplified electrical signal to a signal read line under control of a scan signal line.

6. The driving method of claim 5, wherein a voltage value of the valid level signal provided by the second power supply line is greater than or equal to a voltage value of the valid level signal provided by the first power supply line.

7. A detection panel comprising: a detection region and a peripheral region located at a periphery of the detection region; wherein
the detection region comprises a plurality of pixel sensing circuits disposed on a base substrate;
the peripheral region is at least provided with a power driver, and the power driver is configured to be connected to a pixel sensing circuit through a second power supply line;
the pixel sensing circuit comprises a signal generation sub-circuit, a reset sub-circuit, an amplification sub-circuit, and a read sub-circuit;
the reset sub-circuit is connected to a reset signal line, a first power supply line, and a first node, and is configured to provide a signal of the first power supply line to the first node under control of the reset signal line;
the signal generation sub-circuit is connected to a bias signal line and the first node, and is configured to detect a light signal and convert the detected light signal into an electrical signal;
the amplification sub-circuit is connected to the second power supply line, the first node, and a second node, and is configured to provide an amplified electrical signal to the second node according to a signal provided by the second power supply line and under control of the first node; and
the read sub-circuit is connected to a scan signal line, the second node, and a signal read line, and is configured to output the amplified electrical signal to the signal read line under control of the scan signal line;
wherein a valid level signal provided by the first power supply line and a valid level signal provided by the second power supply line have a same polarity but have different durations; or the scan signal line and the second power supply line are configured to provide a same pulse signal timing sequence; or start time of a valid level signal provided by the second power supply line is earlier than start time of a valid level signal provided by the scan signal line, and end time of the valid level signal provided by the second power supply line is not earlier than end time of the valid level signal provided by the scan signal line.

8. The detection panel of claim 7, wherein the power driver comprises at least one of the following: a gate driver on array (GOA) circuit disposed on the base substrate, a chip on glass (COG) disposed on the base substrate, and a wire on array (WOA) disposed on the base substrate.

9. The detection panel of claim 7, wherein the peripheral region is provided with at least one Y-PCB, and the power driver is disposed on the Y-PCB.

10. The detection panel of claim 9, wherein the peripheral region is further provided with a gate driver configured to be connected to the pixel sensing circuit through the reset signal line and the scan signal line; and
the power driver and the gate driver are respectively disposed on different Y-PCBs; or, the power driver and the gate driver are disposed on a same Y-PCB.

11. The detection panel of claim 7, wherein the peripheral region is further provided with an X-PCB, and the power driver is disposed on the X-PCB.

12. The detection panel of claim 7, wherein the reset sub-circuit comprises a reset transistor; a control electrode of the reset transistor is connected to the reset signal line, a first electrode of the reset transistor is connected to the first power supply line, and a second electrode of the reset transistor is connected to the first node;
the signal generation sub-circuit at least comprises a photoelectric converter; wherein a first electrode of the photoelectric converter is connected to the first node, and a second electrode of the photoelectric converter is connected to the bias signal line;
the amplification sub-circuit comprises an amplification transistor, a control electrode of the amplification transistor is connected to the first node, a first electrode of the amplification transistor is connected to the second power supply line, and a second electrode of the amplification transistor is connected to the second node; and
the read sub-circuit comprises a read transistor, wherein a control electrode of the read transistor is connected to the scan signal line, a first electrode of the read transistor is connected to the second node, and a second electrode of the read transistor is connected to the signal read line.

13. The detection panel of claim 12, wherein the signal generation sub-circuit further comprises a storage capacitor, wherein a first electrode of the storage capacitor is connected to the first node, and a second electrode of the storage capacitor is connected to the bias signal line.

14. An electronic device, comprising a detection panel, the detection panel comprising: a detection region and a peripheral region located at a periphery of the detection region; wherein
the detection region comprises a plurality of pixel sensing circuits disposed on a base substrate;
the peripheral region is at least provided with a power driver, and the power driver is configured to be connected to a pixel sensing circuit through a second power supply line;
the pixel sensing circuit comprises a signal generation sub-circuit, a reset sub-circuit, an amplification sub-circuit, and a read sub-circuit;
the reset sub-circuit is connected to a reset signal line, a first power supply line, and a first node, and is configured to provide a signal of the first power supply line to the first node under control of the reset signal line;
the signal generation sub-circuit is connected to a bias signal line and the first node, and is configured to detect a light signal and convert the detected light signal into an electrical signal;

the amplification sub-circuit is connected to the second power supply line, the first node, and a second node, and is configured to provide an amplified electrical signal to the second node according to a signal provided by the second power supply line and under control of the first node; and the read sub-circuit is connected to a scan signal line, the second node, and a signal read line, and is configured to output the amplified electrical signal to the signal read line under control of the scan signal line;

wherein a valid level signal provided by the first power supply line and a valid level signal provided by the second power supply line have a same polarity but have different durations; or the scan signal line and the second power supply line are configured to provide a same pulse signal timing sequence; or start time of a valid level signal provided by the second power supply line is earlier than start time of a valid level signal provided by the scan signal line, and end time of the valid level signal provided by the second power supply line is not earlier than end time of the valid level signal provided by the scan signal line.

\* \* \* \* \*